United States Patent
Aylward et al.

(12)

(10) Patent No.: US 6,728,456 B1
(45) Date of Patent: Apr. 27, 2004

(54) WAVEGUIDE WITH NANOPARTICLE INDUCED REFRACTIVE INDEX GRADIENT

(75) Inventors: Peter T. Aylward, Hilton, NY (US); Debasis Majumdar, Rochester, NY (US); Anne M. Miller, Batavia, NY (US); Narasimharao Dontula, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 4 days.

(21) Appl. No.: 10/269,628

(22) Filed: Oct. 11, 2002

(51) Int. Cl.[7] .................................................. G02B 6/02
(52) U.S. Cl. ........................................ 385/124; 385/127
(58) Field of Search .................................. 385/123–128

(56) References Cited

U.S. PATENT DOCUMENTS

| | | |
|---|---|---|
| 5,854,326 A | 12/1998 | Sakaya et al. |
| 6,002,826 A | 12/1999 | Veligdan |
| 6,034,163 A | 3/2000 | Barbee et al. |
| 6,086,999 A * | 7/2000 | Ilvashenko .................. 428/375 |
| 6,200,503 B1 * | 3/2001 | Katoot et al. ............... 264/1.27 |
| 6,301,417 B1 | 10/2001 | Biscardi et al. |
| 6,307,995 B1 | 10/2001 | Viligdan |
| 6,428,893 B1 * | 8/2002 | Barraud et al. ............. 428/392 |

* cited by examiner

Primary Examiner—Ellen E. Kim
(74) Attorney, Agent, or Firm—Arthur E. Kluegel

(57) ABSTRACT

An optical element comprising an elongated channel for light travel comprising a light transmitting polymeric central core and further comprising multilayer particles, wherein a majority of the particles have both a longest dimension less than 1 micrometer and an aspect ratio of longest to smallest dimension of from 1000:1, to 10:1, wherein the particles are arranged in a concentration differential in at least a portion of a plane normal to the length of the channel so as to create a refractive index gradient in that plane.

41 Claims, 3 Drawing Sheets

WAVEGUIDE WITH NANOPARTICLE INDUCED REFRACTIVE INDEX GRADIENT

FIELD OF THE INVENTION

This invention relates to a waveguide containing layered particles having lateral dimension of less than 1 micrometer arranged in a concentration gradient and to a method of making the same, and a display screen employing same.

BACKGROUND OF THE INVENTION

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels used for viewing images may be made by stacking waveguides. Such a panel may be thin in its depth compared to its height and width, and the cladding of the waveguides may be made black to increase the black surface area. It is known in the art that waveguide componentis utilized for transmission of light. It is further known in the art that a waveguide has a central transparent core that is clad with a second material of a lower refractive index. In order to provide total internal reflection of light within this waveguide, the central core has a higher refractive index of refraction than the clad. By adjusting the difference in refractive index the acceptance angle of incoming light may be varied. The larger the difference in refractive index, the larger the incoming light acceptance angle.

In related work, U.S. Pat. No. 6,307,995 discloses a gradient refractive index in a planar optical waveguide in which the core material contains fluorinated polymer, silicone, silica, polytetrafluoroethylene and other materials. While this patent discloses certain concentration gradients, there is no practical disclosure as how to make a gradient.

However, optical waveguides of the step index cladding type have some significant drawbacks. In the formation of a large optical panel using stepped index clad waveguides many layers are stacked on top of each other and adhered to each other. In a typical 50 " diagonal screen there may be several hundreds or even thousands of waveguides that are adhered to one another. Handling and cutting many strips of thin polymer is very difficult. The compatibility of materials that have a refractive index difference from core to clad is limited. This may contribute to problems such as inadequate adhesion between layers. Such incompatibility may result in layer to layer interface problems such as air gaps or rough surface or layer separation. These types of problem may cause a loss of light at each bounce at the interface between the core layer and surrounding cladding layers. Although the loss of light at each bounce within the optical waveguide may be small, a light ray may undergo a large number of bounces as it traverses the core layer. Therefore, the amount of light loss that occurs in optical panels becomes a significant detriment to the overall efficiency and performance of the optical panel, as well as the quality such as brightness, and sharpness of the image. When there is a discrete step or boundary between the core and cladding of a waveguide, it is important to control the angle of the incoming light. Light entering a waveguide at acute angles typically will penetrate deeper into the cladding layer than those entering at more oblique angles and therefore it has a higher probability of being scattered resulting in light loss. It would be useful if there was a way to have light within a waveguide turn in a gradual manner and therefore minimize losses due to scattering.

Since there are a limited number of materials that can be used in combination between the core and the clad that provide the desired delta refractive index, adequate adhesion between the layers and can absorb ambient room light, it is important to have a means of controlling or modifying the refractive index of polymers to assure that both optical and physical characteristics are optimized. In stepped refractive index clad waveguides of the type described in U.S. Pat. Nos. 6,002,826, 6,301,417 and 6,307,995 it is important to control or modify the refractive index difference between two different materials or modify the refractive index of the same polymer. If the difference is too large, the ambient light acceptance of the screen becomes large and does not appear to be black. There remains a need for improved control of refractive index as well as a broader selection of materials that can be used.

Another drawback of using optical waveguides of step index cladding type is as follows. When light entering a core layer comprises two or more different wavelengths, a phenomenon known as chromatic dispersion results. Each wavelength portion of light will travel at a slightly different speed and may result in the light exiting the waveguide core at slightly different angles resulting in poor color quality of the image. This means that the exit angle of the light at the outlet face of the optical panel is dependent on the wavelength, or color, of the components of the input light. As can be envisioned, this phenomenon is further exaggerated when the light path that a light ray follows through the core layer increases. The chromatic dispersion that occurs in optical panels using optical waveguides of step index cladding type is another significant detriment to the performance of the optical panel, as well as the quality (e.g. color, sharpness, etc.) of the image.

Ever since the seminal work conducted at Toyota Central Research Laboratories, polymer-clay nanocomposites have generated a lot of interest across industry. The utility of inorganic nanoparticles as additives to enhance polymer performance has been well established. Over the last decade or so, there has been an increased interest in academic and industrial sectors towards the use of inorganic nanoparticles as property enhancing additives. The unique physical properties of these nanocomposites have been explored by such varied industrial sectors as the automotive industry, the packaging industry, and plastics manufacturers. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,164,460; 5,248,720; 5,854,326; and 6,034,163.

In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures: (1) clay tactoids wherein the clay particles are in face-to-face aggregation with no organics inserted within the clay lattice; (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above. Most of the work with nanoclays has been for physical properties modification. Therefore, the need exists for a waveguide that can be made with finite control of the refractive index between the core and the clad that will provide a broader selection of materials that can be used.

PROBLEM TO BE SOLVED BY THE INVENTION

There is a continuing need to improve waveguides that have efficiency problems due to light loss as well as problems with chromatic dispersion. The present invention solves problems experienced in the prior art, such as the decrease in efficiency, performance and quality resulting from the light loss from the discreet bounces that the light undergoes in the optical waveguides of step index cladding type, and the adverse affects of chromatic dispersion when using optical waveguides of step index cladding type, by providing a plurality of planar optical waveguides for an optical panel, the planar optical waveguides comprising a core material having a gradient refractive index.

SUMMARY OF THE INVENTION

The invention provides an optical component comprising an elongated channel for light travel comprising a light transmitting polymeric central core and further comprising multilayer particles, wherein a majority of the particles have both a longest dimension less than 1 micrometer and an aspect ratio of longest to smallest dimension of from 1000:1, to 10:1, wherein the particles are arranged in a concentration differential in at least a portion of a plane normal to the length of the channel so as to create a refractive index gradient in that plane. The invention also provides a method of imaging using the waveguide and a display incorporating the waveguide.

ADVANTAGEOUS EFFECT OF THE INVENTION

The invention provides a means to convey light with improved efficiency.

DETAILED DESCRIPTION OF THE INVENTION

The invention has numerous advantages. It provides layered articles of a size less than 1 micrometer which can be effectively incorporated with a polymer to form a concentration gradient that results in changing refractive index from the center transparent polymeric channel to the outside. Such a material is very useful in the formation of optical components such as optical panels that use gradient refractive index to refract light. The layered particles are typically intercalated clays belonging to the general class of smectite materials that are either natural or synthetic. As the concentration of layered particles is increased the refractive index is decreased and by forming a concentration gradient within a polymer layer, the refractive index is changed as a function of the concentration.

Figure 1:
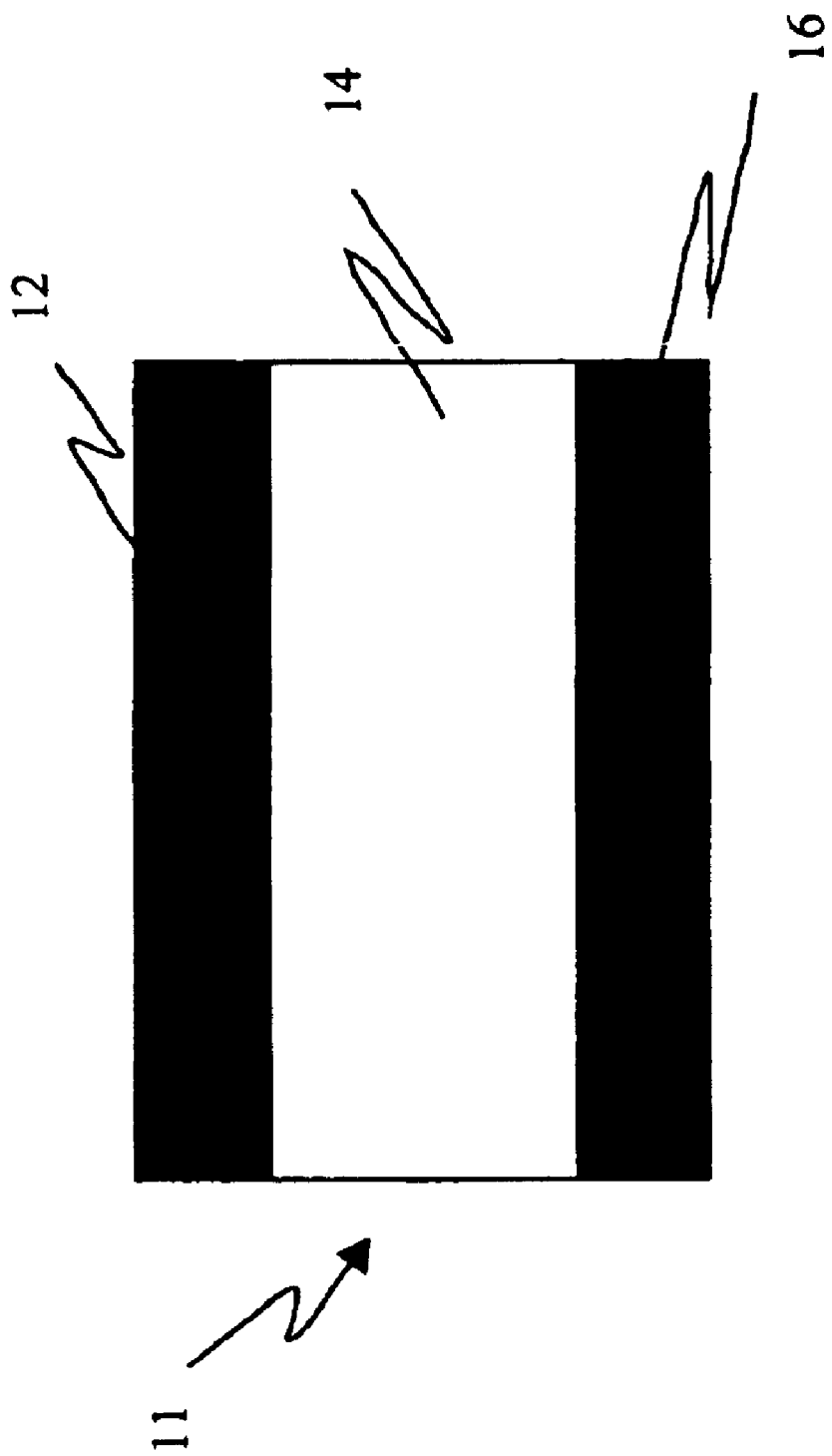
FIG. 1 is a schematic of a typical stepped clad waveguide with an opaque material in the clad.
Figure 2:
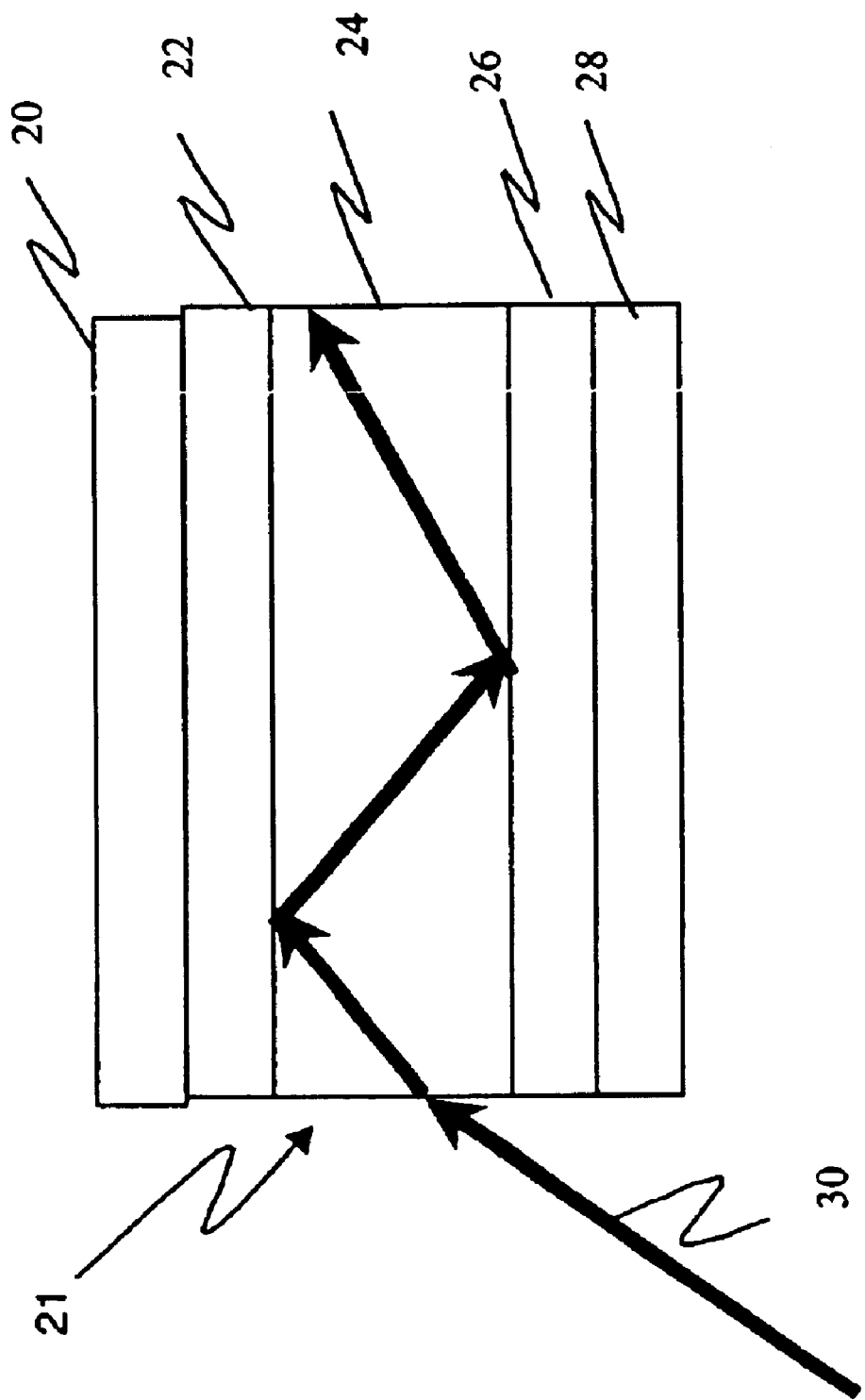
FIG. 2 is a schematic of a typical stepped clad waveguide in which the clad is clear.

For the purpose of this invention, FIG. 1 is a stepped waveguide 11 that has a transparent core 14 and is surrounded by clads 12 on the top and 16 on the bottom that have a lower refractive index than the transparent core and contain black light absorbing materials and also contain adhesive. The refractive index of the core is higher than that of either clads. It is preferable for clads 12 and 16 to be of approximately the same refractive index. A waveguide as shown in FIG. 1 has a uniform refractive index throughout in the transparent core 14 and a lower but uniform refractive index in the clads 12 and 16. FIG. 2 is another type of waveguide in which there is transparent core 24 with clear top clad layer 22 and clear bottom clad layer 26 on either side of core 24. Layers 22 and 26 have a lower refractive index than core 24. Clad cap layers 20 and 28 are black adhesive layers.

As noted in FIG. 2, as light ray 30 enters the core of the waveguide, it travels to the interface formed by core 24 and top clad 22. If clad 22 is a lower refractive index than core 24 and the light is below the critical angle, then it will be totally internally reflected back into the core where it will travel until it hits the interface between core 24 and bottom clad 26. Thus, it is broken into segments that reflect off the cladding and travel through the transparent core. The light will travel a small distance into the clad before it is reflected. If there is roughness or large particles that may cause light scattering, some of the light will be lost and not reflected back into the core 24. This will result in lower efficiency waveguides.

Figure 3:
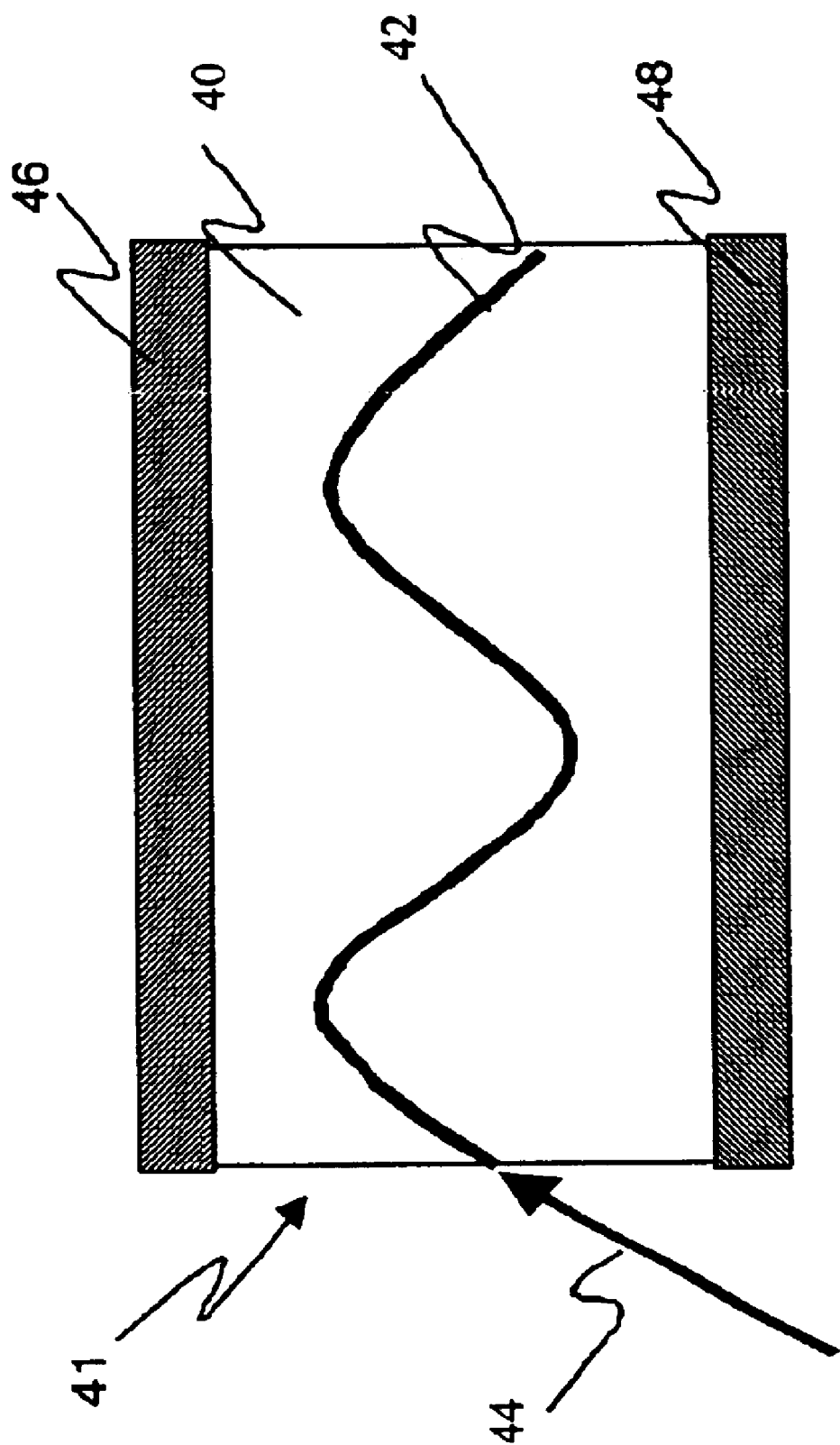
FIG. 3 is a schematic of a waveguide in which the core has a gradient refractive index.

In simple terms, the action of a waveguide can be partially understood by considering FIG. 3. A light-wave entering the waveguide is either refracted into the cladding, and attenuated (absorbed), or is totally internally reflected at the core/clad boundary. In this manner light travels along the length of the waveguide. The maximum angle at which it may enter the transparent core and travel by total internal reflection is termed the acceptance angle. FIG. 3 is a gradient waveguide with a concentration gradient of layered particles. The center of the waveguide has a lower concentration of layered particles than the outer surfaces. This results in a progressive concentration increase and therefore a progressive lowering of the refractive index as light travels from the center to the outer surface. Since there is a gradual change in refractive index, light will be bent slowly as it is redirected back towards the center. Such a device will have less loss and therefore transmit more of the light entering the waveguide.

Thus, a waveguide 41 with a gradient refractive index within the core 40 is a gradient refractive index waveguide. Light ray 44 enters the waveguide from the air or other media, and the light ray 42 is gradually turned within the core as it travels the length of the waveguide. Top clad layer 46 has a lower refractive index than the gradient core and contains black light absorbing materials and also contains adhesive. Bottom clad 48 is a layer that has a lower refractive index than the gradient core and contains black light absorbing materials and also contains adhesive.

The behavior of light entering a material is fundamentally controlled by the property of the material. Perhaps the most important property for waveguiding is to understand the term refractive index. The refractive index of a material is the ratio of the velocity of propagation of an electromagnetic wave in vacuum to its velocity in the medium. The refractive index (n) of a substance is defined as:

$$n=V_v/V$$

where $V_v$ is the velocity of light in a vacuum, and V is the velocity of light in the substance. In general light slows down when it enters a substance, so the refractive index will always be greater than 1. Most materials have refractive indices between 1.32 and 2.40, with values between 1.40 and 1.80 being of the most interest for this invention. It should also be noted that the refractive index of some materials are not necessarily the same in all directions. The internal symmetry of a material is a reflection of the orientation of atoms into layers. The arrangement of the atoms determines how light interacts with the material. Two basic types of behavior are exhibited:

1. Isotropic—same properties (refractive index) in all directions exhibit the same physical properties regardless of where the light enters the crystal
2. Anistropic—different properties (different refractive index) in different directions. These materials are either uniaxial that have two refractive indices in the length direction and width of a sheet or biaxial that are characterized by three refractive indices. These materials add a third refractive index in the thickness plane of the material.

Light entering a waveguide follows Snell's law. Snell's law of geometric optics defines the amount of bending that takes place when a light ray strikes a refractive boundary, e.g., an air-glass interface or the interface of two different polymer, at a non-normal angle. In the following discussion of Snell's law $n_\alpha$ is the index of refraction of the material in which the light ray travels, α is the angle, with respect to the normal at the refractive boundary, at which the light ray strikes the boundary, $n_r$ is the index of refraction of the material in which the refracted ray travels, and β is the angle, with respect to the normal at the refractive boundary, at which the refracted ray travels. The light ray and refracted ray travel in the same plane, on opposite sides of the normal at the point of incidence. If a ray travels from a material of lower refractive index into a medium of higher refractive index, it is bent toward the normal; if it travels from a medium of higher refractive index to a medium of lower index, it is bent away from the normal. If the light ray travels in a material of higher refractive index toward a material of lower refractive index at such an angle that Snell's law would call for the sine of the refracted ray to be greater than unity (a mathematical impossibility). As a result, the "refracted" ray in actuality becomes a reflected ray and is totally reflected back into the medium of higher refractive index, at an angle equal to the incident angle (and thus still "obeys" Snell's Law). This reflection occurs even in the absence of a metallic reflective coating (e.g., aluminum or silver). This phenomenon is called total internal reflection. The smallest angle of incidence, with respect to the normal at the refractive boundary, at which total internal reflection occurs is called the critical angle. In other words total internal reflection is the reflection that occurs when light, in a higher refractive index material, strikes an interface, with a medium with a lower refractive index, at an angle of incidence (with respect to the normal) greater or equal to the critical angle.

Snell's Law $n_\alpha * \sin \alpha = n_r * \sin \beta$

The angle of incidence is measured with respect to the normal at the refractive boundary. At critical angle, since no refraction occurs, β=90 and sin β=1. Thus the critical angle is given by $$\alpha_c = \sin^{-1}(n_r/n_\alpha)$$

where $\alpha_c$ is the critical angle, $n_r$ is the refractive index of the less dense material and $n_\alpha$ is the refractive index of the denser medium.

Geometric optics is the branch of optics that describes light propagation in terms of rays. Rays are bent at the interface between two dissimilar materials. A refracted ray is a ray that undergoes a change of velocity, or in the general case, both velocity and direction, as a result of interaction with the material in which it travels.

The speed of light is not constant. It varies as it passes through different transparent substances. Light travels more slowly through air than it does through the vacuum of empty space, more slowly through water than air, slower yet through quartz, and slower yet through diamond. The speed of light is equal to its wavelength times its frequency. As light passes through different substances or materials (polymers), its frequency remains constant and its wavelength changes. This change of wavelength (speed) at the interface between different materials causes light passing through one and into the other to be bent.

The refractive index for any substance is the ratio of the velocity of light in a vacuum to its velocity in the substance. It is also the ratio of the sine of the angle of incidence to the sine of the angle of refraction ASTM D642. Some typical refractive indexes of material are: Fluorcarbon (FEP) 1.34-Polytetrafluoro—Ethylene (TFE) 1.35 Chlorotrifiuoro—Ethylene (CTFE) 1.42-Cellulose Propionate 1.46-Cellulose Acetate Butyrate 1.46–1.49Cellulose Acetate 1.46–1.50 Methylpentene Polymer 1.485-Ethyl Cellulose 1.47-Acetal Homopolymer 1.48-Acrylics 1.49-Cellulose Nitrate 1.49–1.51 Polypropylene (Unmodified) 1.49-Polyallomer 1.492-Polybutylene 1.50-Ionomers 1.51-Polyethylene (Low Density) 1.51 Nylons (PA) Type II 1.52-Acrylics Multipolymer 1.52-Polyethylene (Medium Density) 1.52-Styrene Butadiene Thermoplastic 1.52–1.55PVC (Rigid) 1.52.–1.55 Nylons (Polyamide) Type 6/6 1.53-Urea Formaldehyde 1.54–1.58Polyethylene (High Density) 1.54-Styrene Acrylonitrile Copolymer 1.56–1.57Polystyrene, 1.57–1.60 Polycarbornate (Unfilled) 1.586-Polystyrenel 1.59Polysulfone. As can be noted from this information many polymers that might be used for waveguiding have refractive indexes that are fairly close together.

As the difference in refractive index between the core and clad of a waveguide becomes larger, the greater is the acceptance angle of light entering the waveguide. That is, light entering from steeper angles can be totally internally reflected without being absorbed. When the refractive index difference between the core and the clad becomes smaller, less light will be totally internally reflected. This becomes important in that the selection of compatible materials is limited. In order to make a waveguide useful for rear projection or other applications, the core and clad material must adhere to each other. Additionally, it is desirable to have a black dye or pigment in the clad. Finding materials that adhere to each other and have an optimal difference in refractive index is difficult.

Additionally, it should be noted that the optimization of a waveguide's performance for rear projection screen that will also minimize ambient room light from entering the waveguide from the viewing side of the screen is to have a controlled difference in the refractive index between the core and the clad. Unmodified polymers have limited versatility for this application. Having the ability to control or modify the refractive index of a polymer is very important and useful when designing waveguide screens. Surprisingly it has been found that by controlling the concentration of nanoparticles such as clays in a polymer martix, that within reason there is infinite control of the refractive index between the polymer and the clay. The clays of this invention help to lower the refractive index of the polymer. In this case the same polymer can be used for the core and the clad and therefore adhesion problems are no longer a concern. Furthermore the control of both incoming light angle acceptance from the light engine and ambient room light from the viewing side can optimized. By forming clays in a concentration gradient within a layer or by forming very thin multiple layers in which the concentration is varied slightly, a waveguide may be formed that has lower losses than stepped waveguides in which a single layer with a large delta refractive index is paired with the central core. This discovery also allows the modification of refractive index of different polymers for the core and cladding.

Whenever used in the specification the terms set forth shall have the following meaning:

Core means one or more layers of a transparent material.

Clad or cladding or clad layer means a layer that is adjacent to the transparent core or adjacent to another clad layer and has a lower refractive index than the central core.

Stepped clad means a layer that has a uniform but lower refractive index than the transparent core.

Gradient refractive index means a changing refractive index from one side of a layer to the other.

Polymeric channel means one or more layers that can be used to transmit light.

"Nanocomposite" means a composite material wherein at least one component comprises an inorganic phase, such as a smectite clay, with at least one dimension in the 0.1 to 100 nanometer range.

"Plates" means particles with two comparable dimensions significantly greater than the third dimension.

"Layered material" means an inorganic material such as a smectite clay that is in the form of a plurality of adjacent bound layers.

"Platelets" means individual layers of the layered material.

"Intercalation" means the insertion of one or more foreign molecules or parts of foreign molecules between platelets of the layered material, usually detected by X-ray diffraction technique, as illustrated in U.S. Pat. No. 5,554,670.

"Intercalant" means the aforesaid foreign molecule inserted between platelets of the aforesaid layered material.

"Exfoliation" or "delamination" means separation of individual platelets in to a disordered structure without any stacking order.

"Polymer" shall include oligomers, copolymers and interpolymers

"ionomer" means a polymer in which the linkages are ionic as well as covalent bonds. There are positively and negatively charged groups that are associated with each other and this polar character makes a unique resin.

"organically modified" means the addition of an organic material or organic end group.

Phyllosilicates such as those described in U.S. Pat. Nos. 4,739,007; 4,810,734; 4,889,885; 4,894,411; 5,102,948; 5,164,440; 5,164,460; 5,248,720; 5,973,053; 5,578,672; and incorporated herein by reference are preferred layered particles for the invention, because of their availability and cost. Particularly preferred phyllosilicates are those, which are fluorinated because of their desirable refractive index value. It is known that phyllosilicates, such as smectite clays, e.g., sodium montmorillonite and calcium montmorillonite, can be treated with organic molecules such as ammonium ions to intercalate the organic molecules between adjacent planar silicate layers and/or exfoliate the individual silicate layers. These silicate layers when admixed with a host polymer before, after or during the polymerization of the host polymer have been found (vide U.S. Pat. Nos. 4,739,007; 4,810,734; and 5,385,776) to improve one or more properties of the polymer, e.g., mechanical strength and/or high temperature characteristics. Phyllosilicates suitable for the present invention include smectite clay, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof.

Additional clay based useful layered particles include illite, mixed layered illite/smectite minerals, such as ledikite and admixtures of illites with the clay minerals named above. The aforesaid clay based materials are described in detail in relevant literature, such as "Clay Colloid Chemistry" by H.van Olphen, $2^{nd}$ Ed., Publishers:John Wiley & Sons, (1977). Other useful layered particles, particularly useful with anionic polymers, are the layered hydrotalcites or double hydroxides, such as $Mg_6Al_{3.4}(OH)_{18.8}(CO_3)_{1.7}H_2O$, which have positively charged layers and exchangeable anions in the in the interlayer spaces. Yet other useful layered particles include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4—2H_2O$, $Zr(HPO_4)_2—2H_2O$, $CaPO_4CH_3—H_2O$, $MnHAsO_4—H_2O$, $Ag_6Mo_{10}O_{33}$ and the like.

Particularly preferred layered particles are those, which are fluorinated because of their desirably low refractive index value. Preferred layered particles can be swellable so that other agents, such as ions or molecules, can intercalate and/or exfoliate the layered particle resulting in a desirable dispersion of the inorganic phase. These swellable layered particles include phyllosilicates of the 2:1 type having a negative charge on the layers and a commensurate number of exchangeable cations in the interlayer space to maintain overall charge neutrality. Typical phyllosilicates with cation exchange capacity of 50 to 300 milliequivalents per 100 grams are preferred. Most preferred layered particles for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as hydrotalcites, chalcogenites and oxides.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the clay particles should have a lateral dimension of between 0.01 µm and 1 µm, and preferably between 0.01 µm and 0.05 µm. The thickness or the vertical dimension of the clay particles can vary but is preferably between 0.5 nm and 10 nm, and more preferably between 1 nm and 5nm. The aspect ratio, which is the ratio of the largest and smallest dimension of the clay particles should be at least 10:1 and up to 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment. Aspect ratio of less than 10:1 may be difficult to obtain and may have limited utility for the added expense. Preferred aspect ratio for the clay for this invention is between 20:1 and 200:1, for optimum properties.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, such as Southern Clay Products and Nanocor, which may be used in the practice of this invention.

The smectite clay of the invention can also be further treated with a compatibilizing agent. The purpose of the compatibilizing agent is to render the inorganic clay phase compatible with the binder polymer in which the clay is preferably dispersed. Typically, the compatibilizing agent comprises a component that bonds with the clay surface and another component that interacts favorably with the binder polymer. Effective compatibilization leads to a homogenous dispersion of the clay in the binder polymer.

Intercalants and compatibilizers, which can also be an intercalants, can vary widely depending on the particular polymer and the particular clay material chosen. Examples of various types of intercalants and compatiblizers useful for treating the preferred smectite clay of this invention are included in, but not limited to, the disclosures of U.S. Pat. Nos. 4,739,007; 4,810,734; 4,889,885; 4,894,411; 5,102, 948; 5,164,440; 5,164,460; 5,248,720; 5,973,053; 5,578, 672; 5,698,624; 5,760,121; 5,804,613; 5,830,528; 5,837, 763; 5,844,032; 5,877,248; 5,880,197; 6,057,396; 5,384, 196; 5,385,776; 5,514,734; 5,747,560; 5,780,376; 6,036, 765; 6,034,163; 6,084,019; 5,952,093; which are incorporated herein by reference.

The optical component of this invention contains a transparent polymeric channel for light travel as a central core containing multilayer particles, wherein a majority of the particles have a projected size less than 1 micrometer and an aspect ratio in the range of longest to smallest dimension of between 1000:1 and 10:1, and the particles are arranged in a concentration differential in at least a portion of a plane normal to the direction of light travel so as to create a refractive index differential In such an optical component, light is guided in such a manner as to minimize the absorption of light and therefore minimize the loss of light. Such a component is useful for directing or conveying light and information from an entrance point to an exit point within the component.

In one embodiment of this invention the central core may comprise a layer. Useful cores may also be clad on one or more sides of the central core. Typical clad layer may contain a stepped or gradient refractive index that is either the same or different from the core. For waveguiding purposes it is desirable to have a gradient refractive index in the central transparent core that has a decreasing differential refractive index from the center axis to the outer sides. The clad layer may either have a further step change in refractive index or a gradient refractive index within itself. The clad may be a polymer or material such as glass that has a lower refractive index than thee core. Additionally the clad may have other functionality such as adhesion, light absorbing or black materials that are opaque.

Central cores useful in this invention may be arcuate. In such a case the optical component may be used for a curved projection screen or a lens shaped device that will bend or direct light Other useful optical components may have a central core that is cylinder shape such as an optical fiber or light pipe. Such a component may be used as an optical coupling that shapewise could join fiber or interface with other optical components. In the case of the optical component that is cylinder shaped there may be at least one surrounding clad layer around the cylinder shaped core.

Additional embodiments of this invention may form an optical component in which the central core is shaped like a lens, which may be convex, concave or complex. By providing a gradient refractive index within the central core of these lens shapes and or within a clad layer associated with the lens shape, light entering the lens may be better controlled. Light entering a lens will see a refractive index change and will be bent either towards the normal or away from the normal depending on whether the lens has a higher or lower refractive index than the media in which the light was traveling prior to entering the lens. The same is true as light exits the lens into air or some other media. If a lens is provided with a gradient refractive index the light tends to curve more rather than turn a sharp angle. Such lenses are more efficient in controlling light. It should be noted that the gradient may be applied to only part of the lens to further enhance its ability to control light. Other optical components useful in this invention are central cores that form lens arrays as well as lens arrays that may form a geometric shape. These types of arrays may be useful as light directing sheet in which a shape is further enhanced with layered particles to provide better improved light turning or shaping properties. The multilayered particles may be added to the central core in a weight percent from 0 to 90%. At 0 percent the refractive index gradient starts with the native material and the gradient may be formed with a concentration of layered particles within the core. As the concentration of layered particles is increased the refractive index is further decreased. It should be noted that a clad may be used with the central core in which a further refractive index change or gradient index change is provided.

In a preferred embodiment of this invention the optical component has layered particles that form a concentration gradient with increasing concentration with distance from the central axis of the light channel in a plane normal to the direction of light travel. This is preferred because such a gradient will provide a waveguide that has less losses than one that has a single or abrupt change in refractive index. In this case light will be kept within the core.

Concentration gradients useful in this invention may provide a constant rate of change or an exponential rate of change. A series of very small step changes in refractive index may also approximate a gradient. In an embodiment of this invention a gradient is formed by a series of steps changes with a refractive index change of less than 0.01 per step. When such a series is heated (still in liquid form) with air there may be a migration of layered particles from one layer into the next therefore smoothing the concentration from a step to a gradient.

Another useful embodiment of this invention provides a concentration gradient with a decreasing refractive index from the central core to the outer edges. Such an optical component provides a privacy screen that is useful for games and computer screens to reduce vertical and or horizontal viewing angle of the screen. This restricts others sitting next to the screen from seeing information that is displayed on the screen.

Layered particles useful in this invention may have a thickness of between 0.5 and 10 nm. Such particles may have an aspect ratio of the largest to smallest dimension of between 10:1 and 1000:1. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers. Aspect ratio of less than 10:1 may be difficult to obtain and may have limited utility for the added expense. Preferred aspect ratio for the clay for this invention is between 20:1 and 200:1, for optimum properties.

The layered particles that are useful in the optical components of this invention may comprise hydrotalcite, phyllosilicate, smectite, montmorillonite, hectorite. These particles and their advantages are described above. Furthermore the smectite may be synthetic or organically modified to further enhance the refractive index property of the particle. The montmorillonite based layered particles may comprise aluminum silicate while hectorite based particles comprises magnesium silicate.

In a preferred embodiments of this invention the smectite and hectorite layered particle may be fluorinated. Such particles are lower in refractive index than non-fluorinated particles and are therefore useful in extending the range of the concentration gradient or providing more efficient light control. Additional details are provided above.

In order to provide useful optical components for this invention the layered particles are dispersed in a transparent polymer that hold them in place. Useful transparent polymers have percent transmission of between 70 and i 100%. Percent transmission below 80% typically are not very efficient and tend to absorb or scatter light. Transparent polymers substantially at or near 100% are the most desirable because there is little or no loss as light travels through the polymer. It should be recognized that all polymers may absorb or scatter some very small fraction of light making 100% transmission difficult to achieve.

Useful transparent polymers of this invention may comprise at least one material selected from the group consisting of water-soluble polymers, hydrophilic colloids, and water insoluble polymers. It should be noted that the transparent polymer may also act as a binder polymer to hold the layered particles.

The binder polymer in which the layered particles, particularly the smectite clays, are preferably dispersed can comprise a wide variety of polymers. Specifically, the binder polymer can comprise a water soluble polymer, hydrophilic colloid or water insoluble polymer, for application from an aqueous or organic solvent based coating composition. Alternatively, the binder polymer can comprise thermally processable thermoplastic or thermosetting polymers, for application from a thermally processable melt.

The water soluble polymers can preferably comprise polyalkylene oxides such as polyethylene oxide, poly 6, (2-ethyloxazolines), poly(ethyleneimine), poly(vinylpyrrolidone), poly(vinyl alcohol), poly (vinyl acetate), polystyrene sulfonate, polyacrylamides, polymethacrylamide, poly(N,N-dimethacrylarnide), poly(N-isopropylacrylamide), polysaccharides, dextrans or cellulose derivatives such as carboxymethyl cellulose, hydroxyethyl cellulose, and the like. Water soluble polymers provide the advantage of an environmentally attractive coating composition. Also, a number of these water soluble polymers can also intercalate the clay, thus, providing a uniform dispersion.

The hydrophilic colloid can preferably comprise gelatin or gelatin grafted polymers. The aforementioned gelatin may comprise, for example, alkali-treated gelatin (cattle bone or hide gelatin), acid-treated gelatin (pigskin or bone gelatin), and gelatin derivatives such as partially phthalated gelatin, acetylated gelatin, and the like, and preferably the deionized gelatins. Gelatin and gelatin based polymers are particularly attractive because of their relatively low cost and ability to intercalate clays.

The water insoluble polymers can comprise polymers soluble in organic solvents or polymers in the form of aqueous dispersions or latexes. Such polymers can preferably comprise polymers of styrene and styrene derivatives, alkyl acryl ate, alkyl methacrylate and their derivatives, olefins, acrylonitrile, acrylic acid, methacrylic acid, maleic acid, itaconic acid, vinyl acetate, vinyl halide, vinylidene halide, cellulose esters such as cellulose acetate and cellulose acetate butyrate, polyurethane, polyester and polyester ionomer. The aforesaid water insoluble polymers can provide useful physical properties, such as adhesion to adjacent layers, toughness, compatibility with organic solvents, etc. A particularly suitable water dispersible polymer comprises polyester ionomer for its excellent film forming characteristics, compatibility with smectite clay and commercial availability.

The thermally processable polymer can be a thermoplastic or a thermosetting polymer. Thermosetting polymers provide an added advantage because they typically are good adhesives and therefore may stick well to a variety of core materials. Thermally processable polymeric materials can comprise polyester, polyolefin, polyurethane, polyamide, polyimide, polycarbonate, polystyrene, polymethyl methacrylate, cellulose esters, polyether, and polyvinyl alcohol. The addition of layered particles to thermally processable polymers can modify their refractive index. Being able to use the same polymer for the core and the clad while being able to lower the clad refractive index from that of the core is very useful particular for adhesion between the layers. Additionally, when more than one layer is being coated at the same time, being able to use the same base polymers in both layers provides improved layer stability and will result in minimal interface problems. Thermally processable polymers are useful as waveguides because the clad may be coextruded or cocast as a separate layer simultaneously with the core. This provides very smooth interface between the layers that will have minimal refraction losses has light travel from the core to the clad layer. These materials provide excellent optical properties for the transmission of images for use as waveguides.

Other materials that are useful as binder polymers in waveguides are radiation curable and may be selected from the group of those containing an acrylate, epoxy and isobutylene moiety. Radiation curable materials provide excellent adhesion between materials and are easily coated on and cured. These materials are also very durable when cured and are able to be within a range of temperatures and humidity.

In general, the choice of the binder polymer in the clad layer may depend on the choice of the core. As a rule of thumb, the binder polymer in the clad should be the same or similar to the polymer in the core to ensure good adhesion, although exception to this rule may abound. As per the invention, the layered particles when dispersed in the binder polymer of the clad, reduces its refractive index, without significantly altering its adhesion to the core. The choice of the core material depends on a number of criteria: the optical properties such as refractive index and transparency, physical properties, dimensional stability, ease of manufacture, availability, cost and the like. Preferred core materials can comprise a cellulose derivative such as cellulose acetate or cellulose acetate butyrate, or polyesters, including amorphous or crystalline polyesters such as polyethylene terephthalate, and polyethylene naphthalate, mainly because of their excellent optical properties, availability, and relatively low cost. Preferred binder polymers in the clad layer for a cellulosic core, are cellulose derivatives such as carboxymethyl cellulose, hydroxyethyl cellulose, cellulose acetate, and cellulose acetate butyrate. Similarly, preferred binder polymers in the clad layer for a polyester core are polyesters such as polyester ionomers.

The optical components useful in this invention may form polymeric channels and may have a thickness of between 0.5 and 1000 micrometers. Below 0.5 micrometers it is difficult to form polymeric channels and maintain good control of the light. Polymeric channels above 1000 micrometers are possible but with increasing thickness become more difficult to build.

The optical components of this invention may form a waveguide that is useful in carrying information. The waveguide may also be used as a display screen. Such display may be used for the projection of images, which may either be still or moving images. In other embodiments of this invention the optical component may form a flat planar waveguide.

The following examples illustrate the practice of this invention. They are not intended to be exhaustive of all possible variations of the invention. Parts and percentages are by weight unless otherwise indicated.

EXAMPLES

The materials used in the examples and comparative samples of the invention include the following.

Layered Particles Within Prescribed Size Range

Laponite S is a fluorinated synthetic clay comprising hydrous magnesium lithium silicate supplied by Southern Clay Products, with the following reported composition (weight %)

| | |
|---|---|
| $SiO_2$ | 50–52 |
| MgO | 22–24 |
| $Li_2O$ | 1.1–1.4 |
| $Na_2O$ | 6.0–8.0 |
| $P_2O_5$ | 3.3–5.5 |
| F | 4.7–5.2 |
| Loss on ignition | 8.5–9.0 |

Laponite RDS is a synthetic clay comprising hydrous magnesium lithium silicate supplied by Southern Clay Products, with the following composition (weight %) as per the product bulletin.

| | |
|---|---|
| $SiO_2$ | 55–56 |
| MgO | 25–27 |
| $Li_2O$ | 0.8 |
| $Na_2O$ | 5.4–5.8 |
| $P_2O_5$ | 4.0–4.2 |
| Loss on ignition | 8.0 |

Binder Polymer

AQ55 is an aqueous dispersible polyester ionomer supplied by Eastman Chemical Company.

Aqueous coating compositions comprising materials described herein above are spin-coated on silicon wafers, for refractive index measurement.

The thickness and optical characterization of the thin films of the invention can be carried out by using any convenient means, including, by way of example only, a variable angle spectroscopic ellipsometer (VASE), obtained for example, from the J. A. Woollam Company. The wavelengths of light to be used can vary from about 400 nm to about 1000 nm and three angles, 65°, 70° and 75° normal to the sample can be typically used. The parameters obtained from VASE can be delta and psi, which are trigonometric parameters which define the resultant ellipsoid after linearly polarized light is ellipsometrically polarized after interacting with the thin film. A Cauchy model and other oscillator models can be fit to delta and psi to derive a thickness value and dispersion curves for the indices of refraction and the extinction coefficients for organic polymer films on silicon substrate. Data are reported at 589 nm.

The refractive index data for layers containing varying amounts of Laponie S dispersed in AQ55 are compiled in Table 1.

TABLE 1

| Sample | Layer Composition Laponite S:AQ55 (wt ratio) | Refractive index |
|---|---|---|
| 1 | 0:100 | 1.56 |
| 2 | 5:95 | 1.56 |
| 3 | 10:90 | 1.55 |
| 4 | 20:80 | 1.53 |
| 5 | 40:60 | 1.52 |

TABLE 1-continued

| Sample | Layer Composition Laponite S:AQ55 (wt ratio) | Refractive index |
|---|---|---|
| 6 | 50:50 | 1.50 |
| 7 | 60:40 | 1.49 |
| 8 | 70:30 | 1.48 |
| 9 | 80:20 | 1.47 |
| 10 | 90:10 | 1.46 |
| 11 | 95:5 | 1.42 |

It is clear from the data in Table 1 that with increasing weight fraction of Laponite S dispersed in AQ 55, the overall refractive index of the layer was reduced, showing the efficacy of the layered particles of the invention in reducing the refractive index of a water dispersible polyester matrix. Since oriented polyethylene terephthalate sheets typically attain a refractive index of greater than 1.6 depending on degree of orientation, any of the layers of samples (2–11) can serve as an effective clad layer of lowered refractive index for an oriented polyethylene terephthalate core.

The refractive index data of Laponite S and Laponite RDS, without any binder polymer, are compared in Table 2. Note that Laponite S and Laponite RDS are very similar in composition except that Laponite S is fluorinated.

TABLE 2

| Layered particle | Refractive index |
|---|---|
| Laponite RDS (un-fluorinated) | 1.44 |
| Laponite S (fluorinated) | 1.40 |

It is clear that Laponite S has a lower refractive index than Laponite RDS, demonstrating the desirability of a fluorinated smectite for the practice of the present invention.

Example of Waveguide Component

A waveguide component of the present invention may be constructed as follows:

| | |
|---|---|
| L1: | Black Adhesive Clad Layer |
| L2 | Top Layer 3 with 20% by weight Laponite S * |
| L3 | Top Layer 2 with 10% by weight Laponite S * |
| L4 | Top Layer 1 with 5% by weight Laponite S * |
| L5 | Polyester with polytetrafluoroethylene Layer |
| L6 | Bottom Layer 1 with 5% by weight Laponite S * |
| L7 | Bottom Layer 2 with 10% by weight Laponite S * |
| L8; | Bottom Layer 3 with 20% by weight Laponite S * |
| L9 | Black Adhesive Clad layer |

* Concentration at time of coating prior to drying.

The core of the waveguide component comprises a ~120 µm thick polyester film base (L5) that has polytetrafluoroethylene added to adjust the refractive index to 1.56 with 3 substantially clear clad layers on each side of the polyester film (L4,L3,L2 on the top and L6,L7 and L8 on the bottom). There is a different and increasing concentration of layered clay particles in each of the clad layer on the same side of the polyester film base. Each layer of L2, 3, 4, 6, 7, and 8 is coated at ~1 µm thick (dry) thickness, comprising Laponite S as the layered particle and AQ55 as the binder polymer. The coating is made from an aqueous coating composition using a three-layer slide-hopper in which all L2,3 and 4 layers are coated simultaneously and dried thoroughly. The Laponite S :AQ55 weight ratio in the clad layers L2, 3 and 4 is maintained at 20:80, 10:90 and 5:95, respectively. When drying the layers, the air impingement force is adjusted to force a slight migration of the particles between layers and therefore creating a gradient effect between the layers. In this example L2, 3 and 4 are coated on the polyester film and dried and then L6, 7 and 8 are coated and dried in a similar manner on the opposite side. In a third coating pass a ~2 µm thick (dry) black adhesive layer comprising a fine dispersion of carbon black and a co-polyester resin (L1 and L9) are coated and dried on each side.

After coating the waveguide structure as describe above, it is slit and chopped into thin strips of 250 mils width by 10000 mils length. The strips are stacked 6000 mils high by placing one on top of the other, clamping the stack with approximately 0.07 MPa pressure and placing the stack in a hot oven (90° C.) for 10 hours. This allows the adhesive layers to fuse together forming a flat planar waveguide.

The refractive index of the polyester and polytetrafluoroethylene core is 1.56 and that of the coated layer formed a gradient with increasing concentration from approximately 1.56 adjacent to the polyester layer to 1.53 on the side furthest from the polyester core.

Embodiments of the invention include those where:

the central core has a percent transmission of between 80 to 100%;

the light transmitting polymer comprises at least one material selected from the group consisting of water-soluble polymers, hydrophilic colloids, and water insoluble polymers and may be thermosetting, such as polyester, cellulose acetate, polycarbonate, polymethylmethacrylate, cyclic olefins and copolymers thereof.

The entire contents of the patents and other publications referred to in this specification are incorporated herein by reference.

PARTS LIST

11 Light channel
12 top clad layer
14 light transmitting core
16 bottom clad layer
21 double clad waveguide
20 top clad cap layer
22 top clad layer
24 light transmitting core
26 bottom clad layer
28 bottom clad cap layer
30 light ray
40 light transmitting core
41 gradient refractive index waveguide
42 light ray
44 light ray entering the waveguide from air or other media
46 top clad layer
48 bottom clad layer

What is claimed is:

1. An optical component comprising an elongated channel for light travel comprising a light transmitting polymeric central core and further comprising multilayer particles, wherein a majority of the particles have both a longest dimension less than 1 micrometer and an aspect ratio of longest to smallest dimension of from 1000:1 to 10:1, wherein the particles are arranged in a concentration differential in at least a portion of a plane normal to the length of the channel so as to create a refractive index gradient in that plane.

2. The optical component of claim 1 wherein the central core comprises a planar shape.

3. The optical component of claim 2 wherein said central core contains layered particles in a concentration gradient so as to provide a decreasing differential refractive index from the center to the outer edges of the central core.

4. The optical component of claim 3 wherein said clad layer is opaque.

5. The optical component of claim 3 wherein said clad layer has a lower refractive index than said central core.

6. The optical component of claim 2 that further comprises a clad layer on one or both sides of the central core.

7. The optical component of claim 6 wherein said clad layer is light absorbing.

8. The optical component of claim 7 wherein said clad layer is black.

9. The optical component of claim 6 wherein said clad layer further comprises an adhesive.

10. The optical component of claim 1 wherein the central core is arcuate.

11. The optical component of claim 1 wherein the central core is cylinder shaped.

12. The optical component of claim 11 wherein said central core is a fiber.

13. The optical component of claim 11 wherein said cylinder has at least one annular shaped clad layer surrounding the cylinder.

14. The optical component of claim 1 wherein the central core is shaped like a lens.

15. The optical component of claim 14 wherein said lens-like shape is convex.

16. The optical component of claim 14 wherein said lens-like shape is concave.

17. The optical component of claim 14 wherein the central core comprises multiple lenses.

18. The optical component of claim 1 wherein the central core is a lens array.

19. The optical component of claim 18 wherein said lens array has a geometric shape.

20. The optical component of claim 1 wherein said layered particles are disposed in said central core in a weight percent of between 0 to 90%.

21. The optical component of claim 1 wherein said layered particles form a concentration gradient with increasing concentration with distance from the center of the light channel in a plane of normal to the direction of the length of the channel.

22. The optical component of claim 1 wherein said concentration gradient represents a linear rate of change.

23. The optical component of claim 1 wherein said concentration gradient represents an exponential rate of change.

24. The optical component of claim 1 wherein said concentration gradient decreases linearly from the central axis to the outer edges.

25. The optical component of claim 1 wherein the multilayer particles have an average thickness of between 0.5 to 10 nm.

26. The optical component of claim 1 wherein the layered particles have an aspect ratio of the largest to smallest particle dimension of between 10:1 and 1000:1.

27. The optical component of claim 1 wherein said multilayer particles comprise a hydrotalcite.

28. The optical component of claim 1 wherein said multilayer particles comprise a phyllosilicate.

29. The optical component of claim 28 wherein said phyllosilicate comprises a smectite.

30. The optical component of claim 29 wherein said smectite comprises montmorillonite.

31. The optical component of claim 30 wherein said montmorillonite comprises aluminum silicate.

32. The optical component of claim 29 wherein said smectite comprises hectorite.

33. The optical component of claim 32 wherein said hectorite is fluorinated.

34. The optical component of claim 32 wherein said hectorite comprises magnesium silicate.

35. The optical component of claim 29 wherein said smectite is synthetic.

36. The optical component of claim 29 wherein said smectite is organically modified.

37. The optical component of claim 29 wherein said smectite is fluorinated.

38. The optical component of claim 1 wherein said polymeric channel has a thickness of between 0.5–1000 micrometers.

39. The optical component of claim 1 wherein said gradient is formed by a series of step changes with a refractive index change of less than 0.01 per step.

40. A method of guiding light comprising allowing light to enter the waveguide of claim 1.

41. A display screen comprising the waveguide of claim 1.

* * * * *